US012629907B2

(12) United States Patent
De Col et al.

(10) Patent No.: US 12,629,907 B2
(45) Date of Patent: May 19, 2026

(54) PLANT FOR BUILDING TYRES OF VEHICLE WHEELS AND METHOD FOR PROVIDING ELONGATED ELEMENTS TO BE USED IN A PROCESS FOR BUILDING TYRES

(71) Applicant: PIRELLI TYRE S.P.A., Milan (IT)

(72) Inventors: Christian De Col, Milan (IT); Albert Berenguer, Milan (IT); Andrea Anfossi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 144 days.

(21) Appl. No.: 18/258,443

(22) PCT Filed: Dec. 28, 2021

(86) PCT No.: PCT/IB2021/062379
§ 371 (c)(1),
(2) Date: Jun. 20, 2023

(87) PCT Pub. No.: WO2022/144766
PCT Pub. Date: Jul. 7, 2022

(65) Prior Publication Data
US 2024/0034014 A1      Feb. 1, 2024

(30) Foreign Application Priority Data

Dec. 29, 2020    (IT) ......................... 102020000032573

(51) Int. Cl.
| | |
|---|---|
| *B29D 30/30* | (2006.01) |
| *B29D 30/00* | (2006.01) |
| *B65H 16/02* | (2006.01) |

(52) U.S. Cl.
CPC ......... *B29D 30/30* (2013.01); *B29D 30/0016* (2013.01); *B65H 16/021* (2013.01);
(Continued)

(58) Field of Classification Search
CPC ................ B29D 30/0016; B29D 30/16; B29D 30/1621; B29D 30/1628; B29D 30/26;
(Continued)

(56) References Cited

U.S. PATENT DOCUMENTS

| | | | |
|---|---|---|---|
| 3,623,677 A | 11/1971 | Appleby et al. | |
| 4,116,401 A | 9/1978 | Evert et al. | |
(Continued)

FOREIGN PATENT DOCUMENTS

| | | |
|---|---|---|
| CA | 2663546 A1 | 3/2008 |
| CN | 104870177 A | 8/2015 |
(Continued)

OTHER PUBLICATIONS

International Search Report and Written Opinion for International Application No. PCT/IB2021/062379 filed on Dec. 28, 2021 on behalf of Pirelli Tyre S.P.A. Mail Date: Apr. 22, 2022 14 pages.
(Continued)

*Primary Examiner* — Sedef E Paquette
(74) *Attorney, Agent, or Firm* — Steinfl + Bruno LLP

(57) ABSTRACT

A method for arranging elongated elements in a process for building tyres for vehicle wheels, including: simultaneously winding a first elongated element and a second elongated element respectively on a first winding support in a first axial position and on a second winding support in a first axial position; simultaneously winding a third elongated element and a fourth elongated element respectively on the first winding support in a second axial position different from the first axial position and on the second winding support in a second axial position different from the first axial position, in which the elongated elements of the second type are the same as each other and different from the elongated elements of the first type.

15 Claims, 7 Drawing Sheets

(52) U.S. Cl.
CPC ............... *B29D 2030/0038* (2013.01); *B29D 2030/3078* (2013.01); *B65H 2301/41368* (2013.01); *B65H 2301/41398* (2013.01); *B65H 2801/93* (2013.01)

(58) Field of Classification Search
CPC ............... B29D 30/30; B29D 30/3021; B29D 30/3028; B29D 30/38; B29D 30/42; B29D 30/44; B29D 2030/0038; B29D 2030/0044; B65H 2801/93
USPC ...................................... 156/110.1, 117, 123
See application file for complete search history.

(56) References Cited

U.S. PATENT DOCUMENTS

| | | | |
|---|---|---|---|
| 5,775,630 | A | 7/1998 | Hogberg et al. |
| 2008/0036120 | A1 | 2/2008 | Lacagnina |
| 2011/0168322 | A1 * | 7/2011 | Mariani ............. B29D 30/2607 156/111 |
| 2014/0034220 | A1 | 2/2014 | Mancini et al. |
| 2015/0283771 | A1 | 10/2015 | Fabbretti et al. |
| 2015/0343730 | A1 | 12/2015 | Marchini et al. |
| 2021/0180219 | A1 | 6/2021 | Cornille et al. |
| 2024/0051250 | A1 | 2/2024 | De Col et al. |
| 2024/0066820 | A1 | 2/2024 | De Col et al. |

FOREIGN PATENT DOCUMENTS

| | | | | |
|---|---|---|---|---|
| CN | 107107502 | A | 8/2017 | |
| CN | 107107505 | A | 8/2017 | |
| CN | 107214987 | A | 9/2017 | |
| CN | 108996297 | A | 12/2018 | |
| CN | 109296704 | A | 2/2019 | |
| CN | 213568937 | U | 6/2021 | |
| EP | 1236669 | A1 * | 9/2002 | ........... B65H 75/025 |
| EP | 1629964 | A2 | 3/2006 | |
| JP | H05293912 | A | 11/1993 | |
| JP | H10296875 | A | 11/1998 | |
| JP | 2009023508 | A | 2/2009 | |
| WO | 2011/101738 | A1 | 8/2011 | |
| WO | 2012/017399 | A1 | 2/2012 | |
| WO | 2012/085776 | A1 | 6/2012 | |
| WO | 2014/011033 | A1 | 1/2014 | |
| WO | 2015/097578 | A1 | 7/2015 | |
| WO | 2015/097579 | A1 | 7/2015 | |
| WO | 2016/103077 | A1 | 6/2016 | |
| WO | 2022/144766 | A1 | 7/2022 | |
| WO | 2022/144768 | A1 | 7/2022 | |
| WO | 2022/144770 | A1 | 7/2022 | |

OTHER PUBLICATIONS

International Search Report and Written Opinion for International Application No. PCT/IB2021/062382 filed on Dec. 28, 2021 on behalf of Pirelli Tyre S.P.A. Mail Date: Apr. 22, 2022 13 pages.
International Search Report and Written Opinion for International Application No. PCT/IB2021/062387 filed on Dec. 28, 2021 on behalf of Pirelli Tyre S.P.A. Mail Date: May 3, 2022 13 pages.
Saudi Arabian Examination Report for SA Application No. 523441366 filed on Dec. 28, 2021 on behalf of Pirelli Tyre S.P.A. Mail Date: Dec. 28, 2023 (English + Original) 10 pages.
First Chinese Office Action for Chinese Application No. 202180088105.5 filed on Dec. 28, 2021 on behalf of Pirelli Tyre S.P.A. Mail Date: Oct. 26, 2023 13 pages (English + Original).
Saudi Arabian Examination Report for Application No. 523441366 filed on May 24, 2022 on behalf of Pirelli Tyre S.P.A. Mail Date: Mar. 8, 2025 10 pages (English + Original).
Non-Final Office Action for U.S. Appl. No. 18/258,192, filed Jun. 16, 2023 on behalf of Pirelli Tyre S.P.A. Mail Date: Nov. 4, 2024 15 pages.
Restriction Requirement for U.S. Appl. No. 18/258,192, filed Jun. 16, 2023 on behalf of Pirelli Tyre S.P.A. Mail Date: Jul. 26, 2024 8 pages.
Final Office Action for U.S. Appl. No. 18/258,192, filed Jun. 16, 2023 for Pirelli Tyre S.P.A. Mail Date: Mar. 31, 2025 10 pages.
Non-Final Office Action for U.S. Appl. No. 18/258,192, filed Jun. 16, 2023 on behalf of Pirelli Tyre S.P.A. Mail Date: Jun. 24, 2025 14 pages.
Non-Final Office Action for U.S. Appl. No. 18/258,685, filed Jun. 21, 2023 for Pirelli Tyre S.P.A. Mail Date: May 14, 2025 17 pages.
Restriction Requirement for U.S. Appl. No. 18/258,443, filed Jun. 20, 2023 on behalf of Pirelli Tyre S.P.A. Mail Date: May 5, 2025 7 pages.
First Chinese Office Action for Chinese Application No. 202180088113 filed Dec. 28, 2021 on behalf of Pirelli Tyre S.P.A. Mail Date: Dec. 24, 2025 (English + Original) 18 pages.
Corrected Notice of Allowability for U.S. Appl. No. 18/258,685, filed Jun. 21, 2023 for Pirelli Tyre S.P.A. Mail Date: Oct. 7, 2025 5 pages.
Non-Final Office Action for U.S. Appl. No. 18/258,443, filed Jun. 20, 2023 on behalf of Pirelli Tyre S.P.A Mail Date: Sep. 12, 2025 18 pages.
Notice of Allowance for U.S. Appl. No. 18/258,192, filed Jun. 16, 2023 for Pirelli Tyre S.P.A. Mail Date: Nov. 13, 2025 12 pages.
Notice of Allowance for U.S. Appl. No. 18/258,685, filed Jun. 21, 2023 for Pirelli Tyre S.P.A. Mail Date: Sep. 30, 2025 8 pages.

* cited by examiner 200, 201, 202, 203

203a, 203b, 203c, 203d 201a, 201b, 201c, 201d 202a, 202b, 202c, 202d 200, 201, 202, 203

PLANT FOR BUILDING TYRES OF VEHICLE WHEELS AND METHOD FOR PROVIDING ELONGATED ELEMENTS TO BE USED IN A PROCESS FOR BUILDING TYRES

CROSS REFERENCE TO RELATED APPLICATIONS

The present application is the US National Stage of International Patent Application No. PCT/IB2021/062379, filed on Dec. 28, 2021, which in turn, claims priority to Italian Application No. IT 102020000032573, filed on Dec. 29, 2020.

The present invention relates to a process and a plant for building tyres for vehicle wheels and method for arranging elongated elements to be used in said process.

A tyre for vehicle wheels generally comprises a carcass structure, a crown structure arranged in radially outer position with respect to the carcass structure and a pair of sidewalls that represent the axially outer surfaces of the tyre, with respect to a mid-plane perpendicular to the rotation axis of said tyre.

The carcass structure comprises at least one carcass ply formed from reinforcing cords incorporated in a matrix of elastomeric material. The carcass ply has opposite end flaps respectively engaged with annular anchoring structures. The latter are arranged in the areas of the tyre usually identified with the name "beads" and are normally each formed by a substantially circumferential annular insert called "bead core" on which at least one filling insert is applied, in radially outer position, tapering radially going away from the rotation axis.

At the beads it is possible to provide specific reinforcing structures having the function of improving the transmission of torque to the tyre.

In the case of "tubeless" tyres, i.e. without an air chamber, a layer of elastomeric material, generally known as "liner", may also be provided in radially inner position with respect to the carcass structure to provide the necessary impermeability to the inflation air of the tyre. Generally, the liner extends from one bead to the other.

The crown structure comprises a belt structure and, in radially outer position with respect to the belt structure, a tread band made of elastomeric material.

The belt structure comprises one or more belt layers arranged radially juxtaposed over one another, having textile or metal reinforcing cords having orientation substantially parallel to the direction of circumferential extension of the tyre (zero degrees layer) and/or having crossed orientation.

Between the carcass structure and the belt structure it is possible to provide a layer of elastomeric material, called "under-belt", having the function of making the radially outer surface of the carcass structure as uniform as possible for the subsequent application of the belt structure.

Longitudinal and transverse grooves are typically shaped on the tread band, arranged to define a desired tread pattern. A so-called 'under-layer' made of elastomeric material of suitable properties to obtain a stable union between the belt structure and the tread band can be arranged between the tread band and the belt structure.

The sidewalls are made of elastomeric material and represent the axially outer surfaces with respect to the annular anchoring structures, to the carcass ply(-ies), to the belt layer(s) and possibly to at least one portion of tread band. For example, the sidewalls each extend from one of the side edges of the tread band up to the respective annular anchoring structure to the beads.

The sidewalls are intended to protect the carcass structure from atmospheric agents and lateral impacts (for example against curbs). In self-supporting tyres, suitable sidewall inserts are suitable for giving the tyre sufficient strength to adequately withstand the load of the vehicle when the tyre is used in a deflated state and for giving favourable properties of comfort when, on the other hand, the tyre is in normally-inflated operating conditions. A sidewall insert made of elastomeric material is preferably arranged in axially outer position with respect to the liner and in axially inner position with respect to each sidewall to define a structure suitable for adequately supporting the tyre in the deflated state, stopping the sidewall from yielding or bulging on itself, without compromising the normal travel conditions.

The term "elastomeric material" is meant to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The term "elongated element" is meant to indicate an element made of elastomeric material having predominant extension along a longitudinal direction thereof. Such an elongated element preferably consists of only elastomeric material.

The term "base surface" of the elongated element is meant to indicate the radially inner surface of each coil of elongated element when it is wound on a storage bobbin. Such a base surface corresponds to the lower surface of the elongated element once unwound from the storage bobbin and arranged on a substantially horizontal plane.

The term "elongated elements that are the same as each other" is meant to indicate elongated elements that have the same composition and geometry. Two elongated elements that are the same as each other consist of a same elastomeric material, have the same shape along a cross section perpendicular to the longitudinal direction of main extension and have the same dimensions along such a cross section. Two elongated elements that are the same as each other also have the same elongation in the longitudinal direction, or in any case such that the elongation of a first elongated element is comprised between 99% and 101% of the elongation of a second elongated element when subjected to a same load in the longitudinal direction.

The term "elongated elements that are different from each other" is meant to indicate elongated elements that have different composition and/or geometry, in which, in combination or alternatively, the elastomeric materials are different in composition, the respective shapes along a cross section perpendicular to the longitudinal direction of main extension are different from each other, such sections have different dimensions. Two elongated elements that are different from each other can also have the same elongation in the longitudinal direction, or in any case such that the elongation of a first elongated element is comprised between 99% and 101% of the elongation of a second elongated element when subjected to a same load in the longitudinal direction, or they can have a different elongation in the longitudinal direction such that the elongation of a first elongated element is less than 99% or greater than 101% of the elongation of a second elongated element, when subjected to a same load in the longitudinal direction.

The term "structural component" of a tyre is meant to indicate any portion thereof capable of carrying out its function or a part thereof. Examples of structural components of the tyre are the following: the carcass structure, the crown structure, or parts thereof, like liner, under-liner, anti-abrasive inserts, bead core, filling inserts in the area of the bead (and therefore the annular anchoring structures defined by bead cores and respective filling inserts), carcass ply(-ies), belt layer(s), belt under-layer, under-layer of the tread band, sidewalls, sidewall inserts, tread band, textile or metal reinforcements, reinforcing elements made of elastomeric material etc., or a part thereof.

The term "service fabric" is meant to indicate a fabric associated with an elongated element arranged to prevent coils of elongated element wound on a winding support from sticking together. Preferably, said service fabric is also configured to give the elongated element a desired structural consistency when it is wound on a winding support.

The term "self-supporting tyre" is meant to indicate a tyre that differs from a standard tyre in that it is capable of supporting the load of the vehicle under a considerable or total loss of pressure, for example when there is a puncture, allowing the driver to travel, for a certain distance, to reach a repair shop without having to stop to change the tyre in a potentially dangerous situation.

The term "winding in parallel" of two elongated elements is meant to indicate a simultaneous winding of a pair of elongated elements on one or more winding supports.

The term "winding diameter" of an elongated element on a storage bobbin or on a winding support is meant to indicate the distance between the rotation axis of the storage bobbin or of the winding support and the point of the elongated element still wound on the storage bobbin or on the winding support and radially farthest from said rotation axis.

The term "deposition direction" of an elongated element on a winding support is meant to indicate the direction along which the elongated element reaches the winding support to be wound on it.

The terms "axial", "axially", "radial", "radially", "circumferential" and "circumferentially" are used with reference to winding supports used in the tyre building process.

In particular, the terms "axial" and "axially" are meant as references/sizes arranged/measured or extending in a substantially parallel direction to a geometric rotation axis of the winding supports.

The terms "radial" and "radially" are meant as references/sizes arranged/measured or extending in a substantially perpendicular direction to a geometric rotation axis of the winding supports and lying in a plane comprising such a geometric rotation axis.

The terms "radially inner/outer" are meant to indicate respectively a position closer to or further away from said geometric rotation axis of the winding supports.

The terms "axially inner/outer" are meant to indicate respectively a position closer to or further away from a mid-plane perpendicular to the geometric rotation axis of the winding supports.

The terms "circumferential" and "circumferentially" are meant as references/sizes arranged/measured or extending along a circumference that extends around the geometric rotation axis of the winding supports.

A tyre for vehicle wheels comprises a plurality of structural components made of elastomeric material. Non-limiting examples of these include: the tread band, the sidewalls, the sidewall inserts, the so-called under-belt and/or under-layer layers, the liner, the annular reinforcing inserts and others.

In production processes of tyres for vehicle wheels at least some of such structural components are made from elongated elements that are wound, in a building line, on a forming drum.

In the Applicant's experience, at least for some types of tyres there is simultaneous deposition on the forming drum of two elongated elements that are the same as each other. An example of such elongated elements deposited simultaneously on the forming drum is a pair of elongated elements that, during the building of a self-supporting tyre, are deposited axially spaced apart on the forming drum, before or after the deposition of one or more carcass plies, to make a respective pair of sidewall inserts of the self-supporting tyre.

The Applicant has observed that in order to simultaneously deposit two elongated elements that are the same as each other on a forming drum, a process is currently provided in which two elongated elements of a same elastomeric material are drawn simultaneously from a single extrusion device.

As the elongated elements progressively come out from the extrusion device, they are deposited on a storage bobbin positioned in the extrusion line substantially downstream of the extrusion device. The deposition of the elongated elements is performed by winding the elongated elements in coils on the storage bobbin, simultaneously making two pluralities of coils axially adjacent to one another and spaced apart on the storage bobbin. During the winding on the storage bobbin, the base surfaces of the elongated elements are coupled with a service fabric that avoids direct contact between the coils of a same elongated element preventing them from sticking together. The service fabric is unwound from a service bobbin during the coupling with the elongated elements.

The storage bobbin with both of the elongated elements that are the same as each other wound is then moved and housed in a storage and, when it is needed, it is taken from the storage and arranged in a building line close to the forming drum.

In the building line, both of the elongated elements that are the same as each other are simultaneously unwound from the storage bobbin and simultaneously deposited on the forming drum to simultaneously make the desired pair of structural components made of elastomeric material. During the unwinding of the elongated elements, the service fabric is separated from the base surface of the elongated elements and wound on a service bobbin.

The Applicant has tackled the problem of building tyres in which the two elongated elements simultaneously deposited on the forming drum are different from each other. Such a requirement could for example be needed, in the Applicant's experience, during the building of a self-supporting tyre in which the sidewall insert of one side of the tyre is different from the sidewall insert of the other side of the tyre.

The Applicant has observed that it would not be possible to simultaneously deposit two elongated elements that are different from each other on the forming drum by actuating the process described above, since each storage bobbin comprises two elongated elements that are the same as each other.

The Applicant has however felt the need to simultaneously deposit two elongated elements that are different from each other on the forming drum without having to redesign or modify the extrusion line and/or the building line.

The Applicant has indeed realized that this would allow using pre-existing production plants, avoiding costs of redesigning, prototyping and production of new extrusion lines and new building lines. This would also allow avoiding to provide new production spaces to house new production plants in addition to those already existing.

The Applicant has observed that in order to use the same pre-existing building lines the building lines should be provided with storage bobbins already configured to simultaneously deposit two elongated elements that are different from each other on the forming drum.

The Applicant has thus observed that it would be desirable to be able to wind elongated elements that are different from each other on storage bobbins arranged in the extrusion line.

The Applicant has however noted that in order to be able to continue to use pre-existing extrusion lines a same extrusion device must continue to extrude pairs of elongated elements that are the same as each other.

The Applicant has thus thought of using in the extrusion line a pair of winding supports on which to wind in parallel firstly two first elongated elements that are the same as each other extruded by the extrusion device and then two second elongated elements that are the same as each other, and different from the first elongated elements, extruded by the same extrusion device, or by another extrusion device.

The Applicant has finally found that by firstly winding in parallel a first pair of elongated elements that are the same as each other on a first winding support and a second winding support and then winding in parallel a second pair of elongated elements that are the same as each other, and different from the elongated elements of the first pair, in different axial positions on the same first winding support and second winding support, it is possible to arrange two elongated elements that are different from each other side-by-side on the first winding support and on the second winding support and thus have winding supports to be provided to the building line to simultaneously deposit two elongated elements that are different from each other on the forming drum.

The present invention therefore relates, in a first aspect thereof, to a method for arranging elongated elements to be used in a process for building tyres for vehicle wheels.

Preferably, it is provided for to wind a first elongated element and a second elongated element of a first type respectively on a first winding support and on a second winding support.

Preferably, it is provided for to arrange the first elongated element in a first axial position on the first winding support.

Preferably, it is provided for to arrange the second elongated element in a first axial position on the second winding support.

Preferably, the first elongated element and the second elongated element of the first type are the same as each other.

Preferably, it is provided for to wind a third elongated element and a fourth elongated element of a second type respectively on said first winding support and on said second winding support.

Preferably, it is provided for to arrange the third elongated element on the first winding support in a second axial position different from the first axial position.

Preferably, it is provided for to arrange the fourth elongated element on the second winding support in a second axial position.

Preferably, the second axial position is different from the first axial position.

Preferably, the elongated elements of the second type are the same as each other.

Preferably, the elongated elements of the second type are different from the elongated elements of the first type.

Preferably, the action of winding a first elongated element and a second elongated element of a first type respectively on said first winding support and on said second winding support takes place simultaneously.

Preferably, the action of winding a third elongated element and a fourth elongated element of a second type respectively on said first winding support and on said second winding support takes place simultaneously.

The Applicant deems that such a method allows to use the extrusion lines already present in a plant and configured to extrude pairs of elongated elements that are the same as each other also in a process in which two elongated elements that are different from each other are simultaneously deposited on the forming drum. The Applicant has indeed found that the winding in parallel of first and second elongated elements that are the same as each other of a first type on a first winding support and a second winding support and the winding in parallel of third and fourth elongated elements that are the same as each other of a second type different from the first type on said first winding support and second winding support can be carried out in an extrusion line comprising an extrusion device from which elongated elements that are the same as each other obtained from a same elastomeric material are simultaneously extruded. The Applicant has verified that the extrusion device can, in a first step, be used to extrude the first type of elongated elements that are the same as each other and, after a change of elastomeric material to be extruded, can then be used to extrude the second type of elongated elements that are the same as each other. The Applicant has also verified that it is possible to use two extrusion devices each of which is configured to extrude pairs of elongated elements of one of the two types of elongated elements.

The Applicant also deems that such a method allows to use the pre-existing building lines configured to simultaneously wind two elongated elements that are the same as each other on a forming drum. The Applicant has indeed verified that the provision on the first and second forming support of respective pairs of elongated elements that are different from each other allows the first and second winding support to simultaneously unwind two elongated elements that are different from each other and allows the simultaneous winding on the forming drum of two elongated elements that are different from each other.

The Applicant also deems that such a method allows to use the pre-existing storages, since they are already configured to store winding supports with elongated elements wound on them.

In a second aspect thereof, the invention relates to a process for building tyres for vehicle wheels.

Such a process preferably comprises carrying out the method in accordance with the first aspect of the present invention.

Preferably, it is provided for to arrange the first winding support or the second winding support in a building line close to a forming drum.

Preferably, it is provided for to simultaneously unwind the first elongated element and the third elongated element from said first winding support or to simultaneously unwind the second elongated element and the fourth elongated element from said second winding support and deposit them simultaneously on the forming drum.

The Applicant deems that, in this way, it is possible to simultaneously deposit pairs of elongated elements that are different from each other on a forming drum without having to modify the existing building lines.

In a third aspect thereof, the invention relates to a plant for building tyres for vehicle wheels.

Preferably, a first winding station is provided that is configured to simultaneously wind a first elongated element and a second elongated element of a first type respectively on a first winding support and on a second winding support in respective first axial positions.

Preferably, the first winding station is also configured to simultaneously wind a third elongated element and a fourth elongated element of a second type different from the elongated elements of the first type respectively on said first winding support and said second winding support in respective second axial positions.

Alternatively, a second winding station is provided that is configured to simultaneously wind the third elongated element and the fourth elongated element of a second type different from the elongated elements of the first type respectively on said first winding support and said second winding support in respective second axial positions.

Preferably, said second axial positions are different from said first axial positions.

Preferably, an unwinding station is provided that is configured to simultaneously unwind an elongated element of the first type and an elongated element of the second type from said first winding support or from said second winding support.

Preferably, a building line is provided comprising at least one forming drum operatively associated with the unwinding station to simultaneously receive an elongated element of the first type and an elongated element of the second type from said first winding support or from said second winding support.

In at least one of the aforementioned aspects, the present invention can have at least one of the preferred characteristics described hereinafter.

Preferably, simultaneously winding the first elongated element and the second elongated element comprises arranging the first winding support and the second winding support in respective first winding positions.

Preferably, simultaneously winding the third elongated element and the fourth elongated element comprises arranging the first winding support and the second winding support in respective second winding positions.

Preferably, arranging the first winding support and the second winding support in the respective second winding positions comprises moving the first winding support and the second winding support from the respective first winding positions to the respective second winding positions.

Preferably, moving the first winding support and the second winding support from the respective first winding positions to the respective second winding positions is carried out with the first winding support connected to the second winding support.

Preferably, moving the first winding support and the second winding support into the respective second winding positions comprises arranging the first winding support with the first elongated element wound on it and the second winding support with the second elongated element wound on it in the respective second winding positions.

Preferably, winding the first elongated element on the first winding support is carried out before moving the first winding support and the second winding support into the respective second winding positions.

Preferably, winding the second elongated element on the second winding support is carried out before moving the first winding support and the second winding support into the respective second winding positions.

Preferably, winding the third elongated element on the first winding support is carried out after having wound the first elongated element on the first winding support.

Preferably, winding the fourth elongated element on the second winding support is carried out after having wound the second elongated element on the second winding support.

Preferably, the first axial position on the first winding support is axially spaced from the first axial position on the second winding support by a first distance.

Preferably, the second axial position on the first winding support is axially spaced from the second axial position on the second winding support by a second distance.

Preferably, said first distance is equal to said second distance.

Preferably, when the first winding support is in the respective second winding position, the second axial position on the first winding support coincides with the first axial position on the first winding support when the first winding support is in the respective first winding position.

Preferably, when the second winding support is in the second winding position, the second axial position on the second winding support coincides with the first axial position on the second winding support when the second winding support is in the respective first winding position.

Preferably, winding in parallel the first elongated element and the second elongated element on the first winding support and on the second winding support comprises associating a first service fabric with the first elongated element and a second service fabric with the second elongated element.

Each service fabric is preferably associated with a base surface of the respective elongated element. The service fabrics give the elongated elements a desired structural consistency, thus preventing the elongated elements from deforming during the winding or unwinding from a winding support. The service fabrics also avoid the direct contact of elastomeric material when the elongated elements are wound in coils.

Preferably, associating the first service fabric with the first elongated element comprises unwinding the first service fabric from a first auxiliary winding support.

Preferably, associating the second service fabric with the second elongated element comprises unwinding the second service fabric from a second auxiliary winding support.

Preferably, the unwinding of the first service fabric and of the second service fabric respectively from the first auxiliary winding support and from the second auxiliary winding support takes place simultaneously with the winding of the first elongated element and of the second elongated element on the first winding support and on the second winding support.

Preferably, the winding of the first elongated element on the first winding support takes place by means of a pulling action exerted by the first service fabric after the coupling with the first elongated element.

Preferably, the winding of the second elongated element on the second winding support takes place by means of a pulling action exerted by the second service fabric after the coupling with the second elongated element.

Preferably, unwinding the first service fabric and the second service fabric comprises arranging the first auxiliary winding support and the second auxiliary winding support in respective first unwinding positions.

Preferably, when the first auxiliary winding support is arranged in the respective first unwinding position the first service fabric is aligned with a deposition direction of the first elongated element on the first winding support.

Preferably, when the second auxiliary winding support is arranged in the respective first unwinding position the second service fabric is aligned with a deposition direction of the second elongated element on the second winding support.

Preferably, winding in parallel the third elongated element and the fourth elongated element respectively on the first winding support and on the second winding support comprises associating a third service fabric with the third elongated element and a fourth service fabric with the fourth elongated element.

Preferably, associating the third service fabric with the third elongated element comprises unwinding the third service fabric from the first auxiliary winding support.

Preferably, associating the fourth service fabric with the fourth elongated element comprises unwinding the fourth service fabric from the second auxiliary winding support.

Each service fabric is preferably associated with a base surface of the respective elongated element.

Preferably, the unwinding of the third service fabric and of the fourth service fabric respectively from the first auxiliary winding support and from the second auxiliary winding support takes place simultaneously with the winding of the third elongated element and of the fourth elongated element on the first winding support and on the second winding support.

Preferably, the winding of the third elongated element on the first winding support takes place by means of a pulling action exerted by the third service fabric after the coupling with the third elongated element.

Preferably, the winding of the fourth elongated element on the second winding support takes place by means of a pulling action exerted by the fourth service fabric after the coupling with the fourth elongated element.

Preferably, unwinding the third service fabric and the fourth service fabric comprises arranging the first auxiliary winding support and the second auxiliary winding support in respective second unwinding positions.

Preferably, when the first auxiliary winding support is arranged in the respective second unwinding position the third service fabric is aligned with a deposition direction of the third elongated element on the first winding support.

Preferably, when the second auxiliary winding support is arranged in the respective second unwinding position the fourth service fabric is aligned with a deposition direction of the fourth elongated element on the second winding support.

Preferably, unwinding the first service fabric and the second service fabric comprises unwinding the first service fabric and the second service fabric from respective first axial positions on the first auxiliary winding support and on the second auxiliary winding support.

Preferably, unwinding the third service fabric and the fourth service fabric comprises unwinding the third service fabric and the fourth service fabric from respective second axial positions on the first auxiliary winding support and on the second auxiliary winding support.

Preferably, the first axial position on the first auxiliary winding support is axially spaced from the first axial position on the second auxiliary winding support by a third distance.

Preferably, the second axial position on the first auxiliary winding support is axially spaced from the second axial position on the second auxiliary winding support by a fourth distance.

Preferably, said third distance is equal to said fourth distance.

Preferably, arranging the first auxiliary winding support and the second auxiliary winding support in respective second unwinding positions comprises moving the first auxiliary winding support and the second auxiliary winding support from the respective first unwinding positions to the respective second unwinding positions.

Preferably, moving the first auxiliary winding support and the second auxiliary winding support into the respective second unwinding positions comprises arranging the first auxiliary winding support with the third service fabric wound on it and the second auxiliary winding support with the fourth service fabric wound on it in the respective second unwinding positions.

In a variant embodiment of the first service fabric, it comprises a resting surface and respective two axial end shoulders.

In this case, preferably it is provided for to associate the first elongated element with the resting surface of the first service fabric between the respective two axial end shoulders.

In a variant embodiment of the second service fabric, it comprises a resting surface and respective two axial end shoulders.

In this case, preferably it is provided for to associate the second elongated element with the resting surface of the second service fabric between the respective two axial end shoulders.

Preferably, the two axial end shoulders of the first service fabric have equal extension in the radial direction and have greater extension in the radial direction than the extension in the radial direction of the first elongated element.

Preferably, the two axial end shoulders of the second service fabric have equal extension in the radial direction and have greater extension in the radial direction than the extension in the radial direction of the second elongated element.

Preferably, when the first service fabric and the first elongated element are wound on the first winding support the axial end shoulders of the first service fabric of one coil are in contact with the axial end shoulders of the first service fabric of a radially adjacent coil.

Similarly, preferably, when the second service fabric and the second elongated element are wound on the second winding support the axial end shoulders of the second service fabric of one coil are in contact with the axial end shoulders of the second service fabric of a radially adjacent coil.

In a variant embodiment of the third service fabric, it comprises a resting surface and respective two axial end shoulders.

In this case, preferably it is provided for to associate the third elongated element with the resting surface of the third service fabric between the respective two axial end shoulders.

In a variant embodiment of the fourth service fabric, it comprises a resting surface and respective two axial end shoulders.

In this case, preferably it is provided for to associate the fourth elongated element with the resting surface of the fourth service fabric between the respective two axial end shoulders.

Preferably, the two axial end shoulders of the third service fabric have equal extension in the radial direction and have greater extension in the radial direction than the extension in the radial direction of the third elongated element.

Preferably, the two axial end shoulders of the fourth service fabric have equal extension in the radial direction and have greater extension in the radial direction than the extension in the radial direction of the fourth elongated element.

Preferably, when the third service fabric and the third elongated element are wound on the third winding support the axial end shoulders of the third service fabric of one coil are in contact with the axial end shoulders of the third service fabric of a radially adjacent coil.

Similarly, preferably, when the fourth service fabric and the fourth elongated element are wound on the fourth winding support the axial end shoulders of the fourth service fabric of one coil are in contact with the axial end shoulders of the fourth service fabric of a radially adjacent coil.

This type of service fabrics is particularly preferred when the first elongated element and the third elongated element have winding diameters that are different from each other and when the second elongated element and the fourth elongated element have winding diameters that are different from each other.

In a first variant embodiment of the first winding support, preferably the first winding support comprises a storage bobbin having a winding surface sized to receive the first elongated element and the third elongated element axially spaced apart.

In this variant embodiment, preferably the second winding support comprises a storage bobbin having a winding surface sized to receive the second elongated element and the fourth elongated element axially spaced apart.

In a second variant embodiment of the first winding support, preferably the first winding support comprises a first storage bobbin and a second storage bobbin each of which having a winding surface sized to receive said first elongated element and said third elongated element.

The first storage bobbin and the second storage bobbin of the first winding support are preferably structurally distinct and coupled together to rotate about a common rotation axis.

Preferably, it is provided for to arrange the first storage bobbin in the first winding position and the second storage bobbin of the first winding support in the second winding position.

Preferably, when the first storage bobbin and the second storage bobbin of the first winding support are in the first winding position and in the second winding position the first storage bobbin and the second storage bobbin are connected by a coupling device.

Preferably, the coupling device is configured to set the first storage bobbin in rotation with respect to the second storage bobbin of the first winding support about said rotation axis.

In this variant embodiment, winding the first elongated element in a first axial position on the first winding support preferably comprises winding the first elongated element on the first storage bobbin.

In this variant embodiment, winding the third elongated element in a second axial position on the first winding support preferably comprises winding the third elongated element on the second storage bobbin.

In this variant embodiment, preferably the second winding support comprises a first storage bobbin and a second storage bobbin each of which having a winding surface sized to receive said second elongated element and said fourth elongated element.

The first storage bobbin and the second storage bobbin of the second winding support are preferably structurally distinct and coupled together to rotate about a common rotation axis.

Preferably, it is provided for to arrange the first storage bobbin in the first winding position and the second storage bobbin of the second winding support in the second winding position.

Preferably, when the first storage bobbin and the second storage bobbin of the second winding support are in the first winding position and in the second winding position the first storage bobbin and the second storage bobbin are connected by a coupling device.

Preferably, the coupling device is configured to set the first storage bobbin in rotation with respect to the second storage bobbin of the second winding support about said rotation axis.

In this variant embodiment, winding the second elongated element in a second axial position on the second winding support preferably comprises winding the second elongated element on the first storage bobbin.

In this variant embodiment, winding the fourth elongated element in a second axial position on the second winding support preferably comprises winding the fourth elongated element on the second storage bobbin.

Preferably, simultaneously winding a first elongated element and a second elongated element comprises arranging a first elastomeric material in a first extrusion line and simultaneously extruding the first elongated element and the second elongated element.

Preferably, simultaneously winding a third elongated element and a fourth elongated element comprises changing elastomeric material in said first extrusion line and simultaneously extruding the third elongated element and the fourth elongated element.

Preferably, simultaneously winding a first elongated element and a second elongated element comprises simultaneously extruding the first elongated element and the second elongated element from a first extrusion line.

Preferably, simultaneously winding a third elongated element and a fourth elongated element comprises simultaneously extruding the third elongated element and the fourth elongated element from a second extrusion line.

Preferably, a first extrusion line is provided comprising at least one extrusion device.

Preferably, the extrusion device is configured to simultaneously extrude the first elongated element and the second elongated element.

Preferably, the extrusion device is configured to simultaneously extrude the third elongated element and the fourth elongated element.

Preferably, a second extrusion line is provided comprising at least one extrusion device configured to simultaneously extrude the third elongated element and the fourth elongated element.

Preferably, the first elongated element and the second elongated element are made simultaneously in the first extrusion line and transferred to the first winding station.

Preferably, the third elongated element and the fourth elongated element are made simultaneously in the first extrusion line after the first elongated element and the second elongated element and transferred to the first winding station.

Preferably, the extrusion of the third elongated element and of the fourth elongated element takes place after a change of elastomeric material in the first extrusion line.

Preferably, the extrusion of the third elongated element and of the fourth elongated element takes place in said extrusion device of said first extrusion line.

Alternatively, the third elongated element and the fourth elongated element are made in a second extrusion line.

In this case, preferably, the extrusion of the third elongated element and of the fourth elongated element takes place in a further extrusion device of said second extrusion line.

In this case, the third elongated element and the fourth elongated element are made simultaneously in the second extrusion line and transferred to the second winding station.

Arranging the first coupling device with the first elongated element and the third elongated element wound on it in a building line close to a forming drum preferably comprises bringing the first winding support into an unwinding station.

Preferably, simultaneously unwinding the first elongated element and the third elongated element from the first winding support comprises simultaneously removing said first service fabric from the first elongated element and said third service fabric from the third elongated element.

Preferably, the unwinding of the first elongated element from the first winding support takes place by means of a pulling action exerted on the first service fabric.

Preferably, the unwinding of the third elongated element from the first winding support takes place by means of a pulling action exerted on the third service fabric.

Preferably, the first service fabric removed from the first elongated element is collected on a first collecting winding support.

Preferably, the third service fabric removed from the third elongated element is collected on the first collecting winding support.

Preferably, the removal and the collection of the first service fabric and of the third service fabric takes place during the simultaneous unwinding of the first elongated element and of the third elongated element.

Arranging the second coupling device with the second elongated element and the fourth elongated element wound on it in a building line close to a forming drum preferably comprises bringing the second winding support into an unwinding station.

Preferably, simultaneously unwinding the second elongated element and the fourth elongated element from the second winding support comprises simultaneously removing said second service fabric from the second elongated element and said fourth service fabric from the fourth elongated element.

Preferably, the unwinding of the second elongated element from the second winding support takes place by means of a pulling action exerted on the second service fabric.

Preferably, the unwinding of the fourth elongated element from the second winding support takes place by means of a pulling action exerted on the fourth service fabric.

Preferably, the second service fabric removed from the second elongated element is collected on a second collecting winding support.

Preferably, the fourth service fabric removed from the fourth elongated element is collected on the second collecting winding support.

Preferably, the removal and the collection of the second service fabric and of the fourth service fabric takes place during the simultaneous unwinding of the second elongated element and of the fourth elongated element.

Preferably, after having wound the first elongated element and the second elongated element on the first winding support and on the second winding support the first winding support and the second winding support are transferred from the winding station into a storage.

Preferably, before winding the third elongated element and the fourth elongated element on the first winding support and on the second winding support, the first winding support and the second winding support are transferred from the storage to the winding station.

Preferably, after having wound the third elongated element and the fourth elongated element on the first winding support and on the second winding support the first winding support and the second winding support are transferred from the winding station into a storage.

Further characteristics and advantages of the present invention will become clearer from the following detailed description of preferred embodiments thereof, made with reference to the attached drawings.

Figures 8, 9:
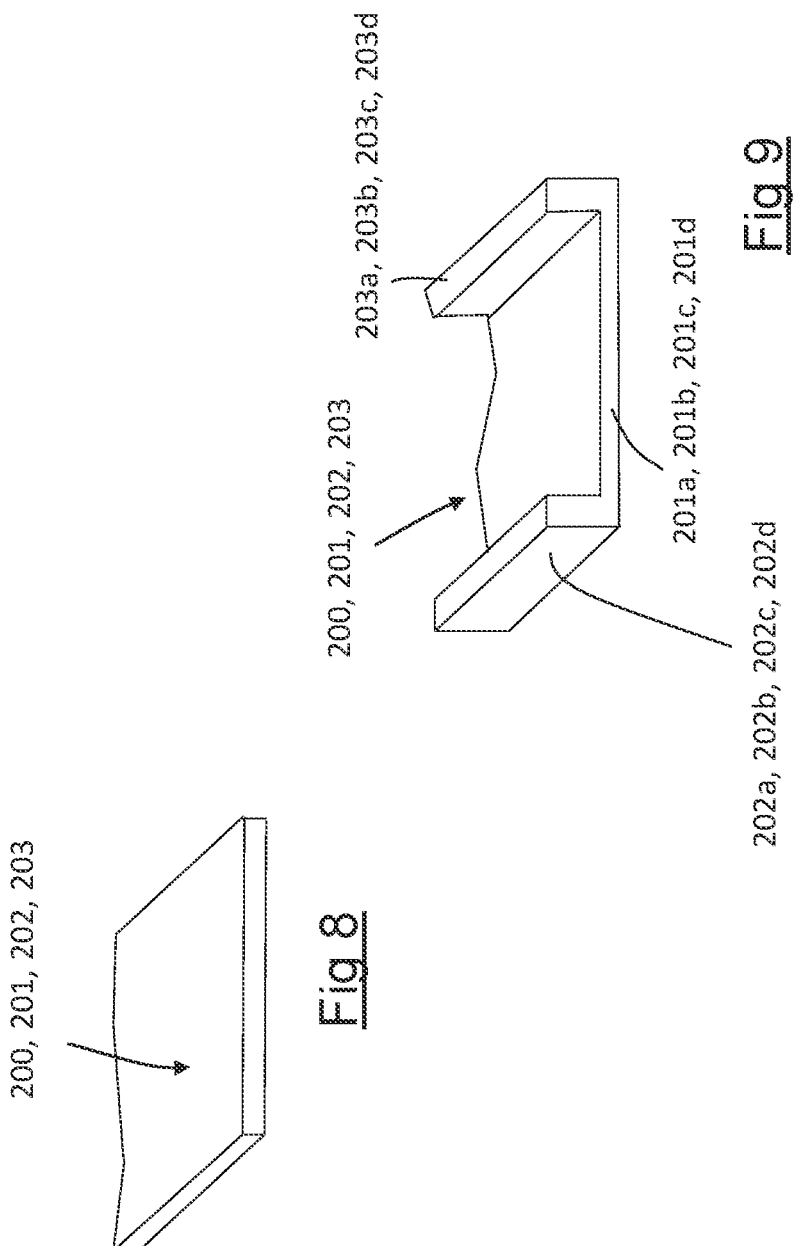
Figure 10:
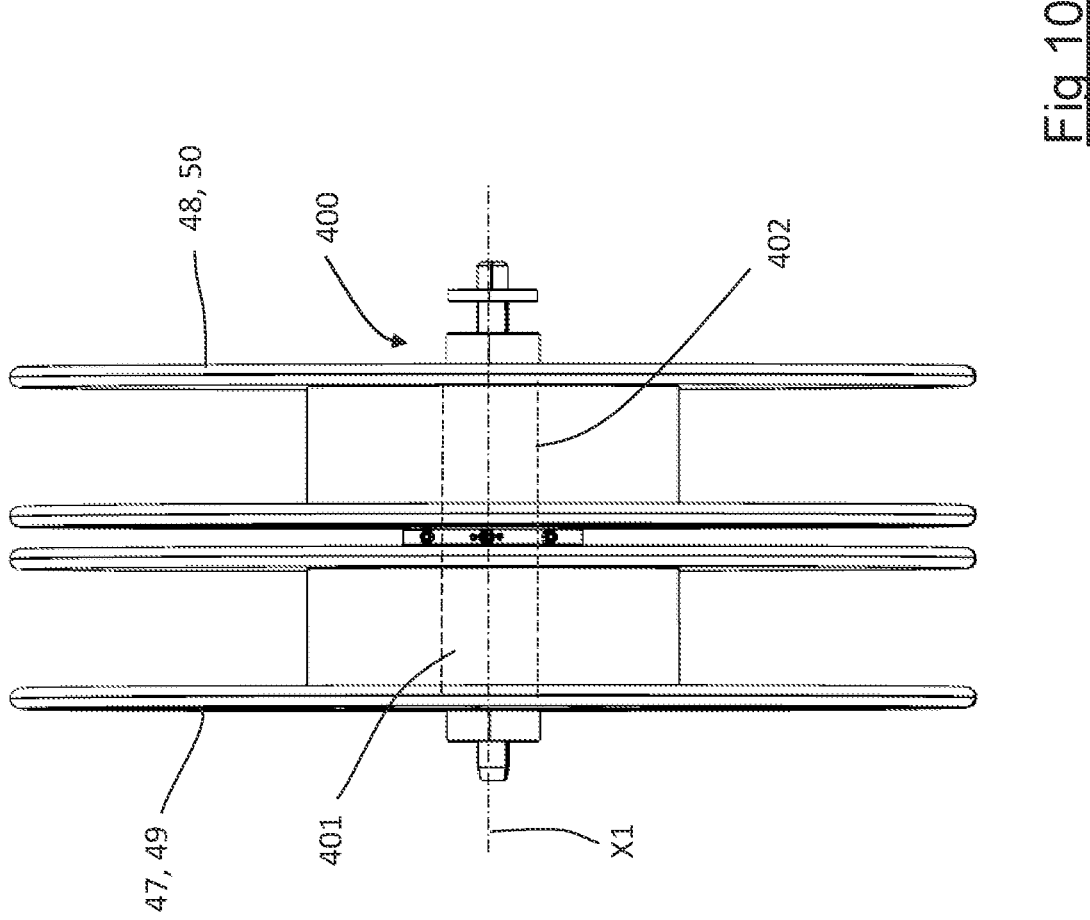

FIGS. 8 and 9 represent two types of service fabrics suitable to be used in the plant of FIG. 1 and in the method for arranging elongated elements in accordance with the present invention; and FIG. 10 is a schematic side view of a coupling device connected to two storage bobbins suitable to be used in the plant of FIG. 1 and in the method for arranging elongated elements in accordance with the present invention.

Figures 1A, 1B:
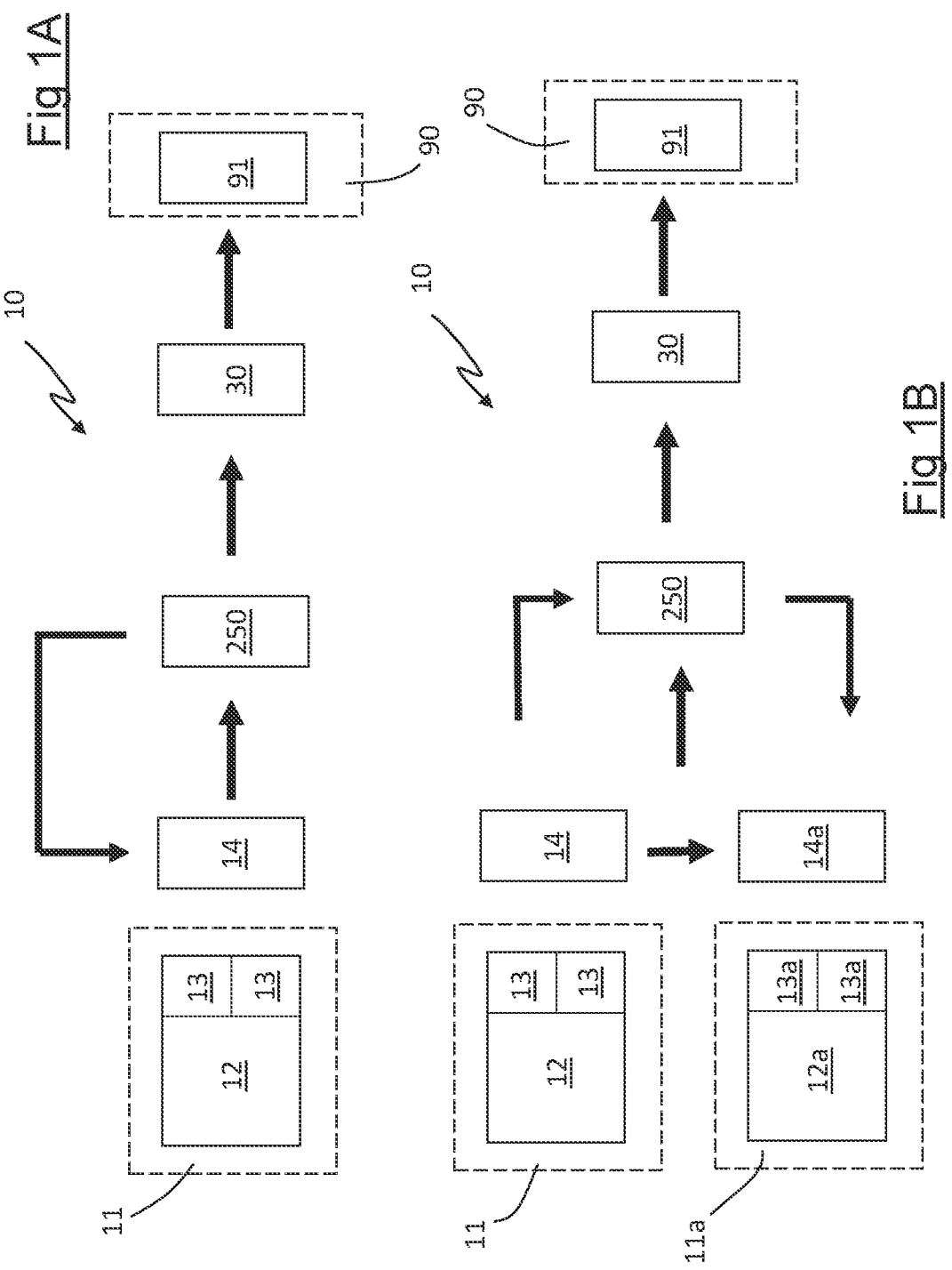
FIGS. 1A and 1B are a schematic representation of two variants of a plant for building tyres for vehicle wheels in accordance with the present invention.

With reference to FIGS. 1A and 1B, a first variant and a second variant of a plant for building tyres for vehicle wheels in accordance with the present invention have been wholly indicated with reference numeral 10.

In both of the variant embodiments, the plant 10 comprises a first extrusion line 11 of elongated elements made of elastomeric material.

In the variant embodiment illustrated in FIG. 1B, the plant 10 also comprises a second extrusion line 11a.

The first extrusion line 11 and the second extrusion line 11a are the same as each other. Each extrusion line 11, 11a comprises an extrusion device 12, 12a configured to operate on an elastomeric material and extrude it in the form of elongated element. Each extrusion line 11, 11a comprises two shaping elements 13, 13a configured to operate on a pair of elongated elements exiting from the extrusion device 12, 12a.

In both of the variant embodiments of the plant 10, the first extrusion line 11 extrudes a first elongated element 150 and a second elongated element 151 of a first type that are the same as each other.

In the variant embodiment illustrated in FIG. 1A, the first extrusion line 11 is used, after a change of elastomeric material, to extrude a second pair of elongated elements, in particular a third elongated element 152 and a fourth elongated element 153 of a second type that are the same as each other and different from the first elongated element 150 and from the second elongated element 151.

In the variant embodiment illustrated in FIG. 1B, the second extrusion line 11*a* is used to extrude the third elongated element 152 and the fourth elongated element 153 of the second type that are the same as each other and different from the first elongated element 150 and from the second elongated element 151.

The plant 10 comprises a first winding station 14, associated with the first extrusion line 11 and in which the extruded elongated elements are wound on winding supports.

Figures 2, 3:
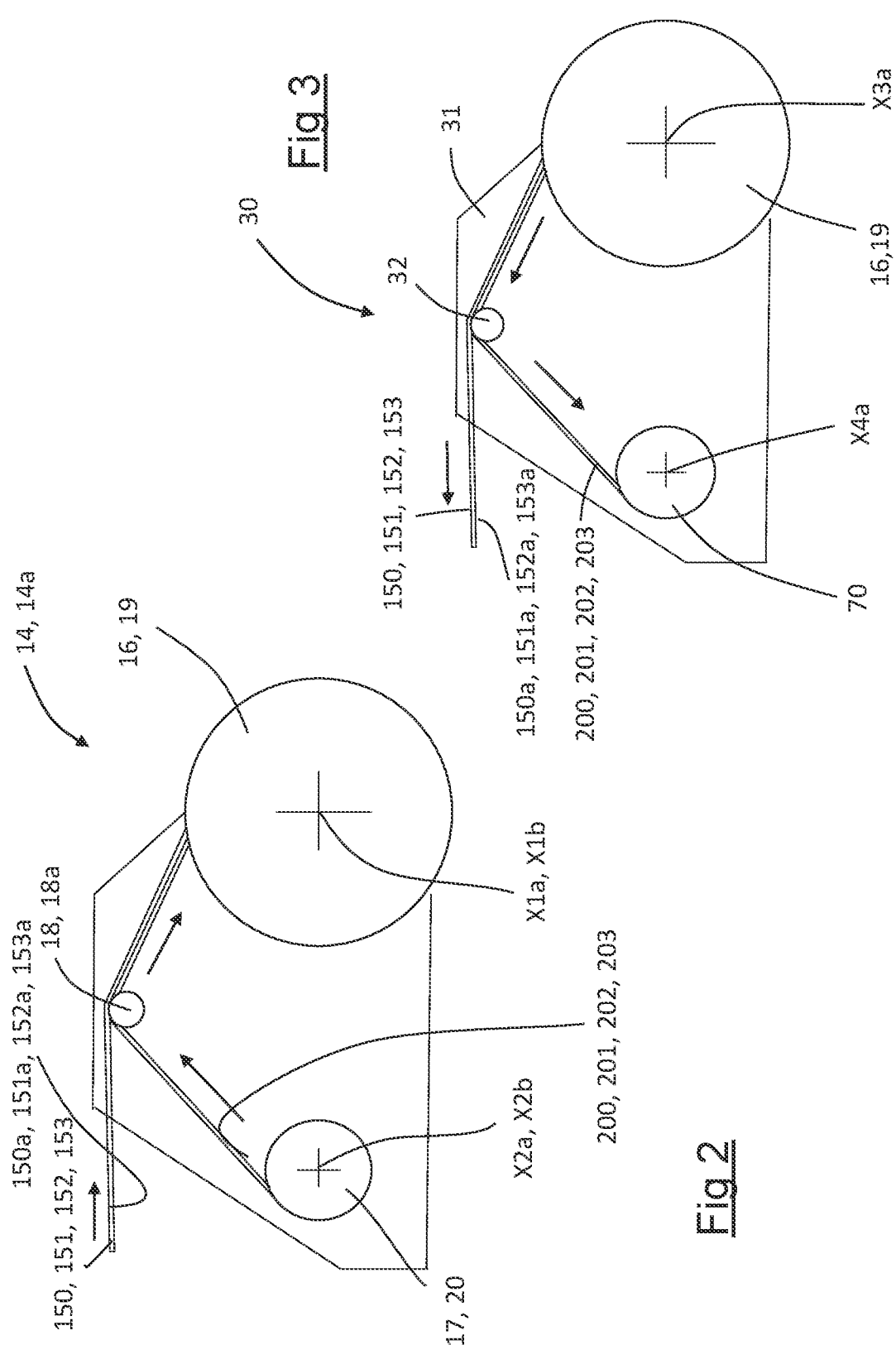
FIGS. 2, 2A and 2B are schematic representations of some parts of the plant of FIG. 1.
FIG. 3 is a schematic representation of other parts of the plant of FIG. 1.

As schematically represented in FIG. 2, in the first winding station 14 it is possible to mount and dismount a first winding support 16 and a second winding support 19 able to rotate about a common rotation axis X1*a*. In the first winding station 14 it is also possible to mount and dismount a first auxiliary winding support 17 and a second auxiliary winding support 20 able to rotate about a respective rotation axis X2*a*.

The first auxiliary winding support 17 is configured to unwind a first service fabric 200. The first service fabric 200 is fed to a coupling roller 18 on which the first elongated element 150 is also fed. At the coupling roller 18, the first service fabric 200 is coupled with a base surface 150*a* of the first elongated element 150.

The second auxiliary winding support 20 is configured to unwind a second service fabric 201. The second service fabric 201 is fed to the coupling roller 18 on which the second elongated element 151 is also fed. At the coupling roller 18, the second service fabric 201 is coupled with a base surface 151*a* of the second elongated element 151.

During the winding of the first elongated element 150 on the first winding support 16 and of the second elongated element 151 on the second winding support 19, the first winding support 16 and the second winding support 19 are arranged in respective first winding positions.

Figures 2A, 2B:
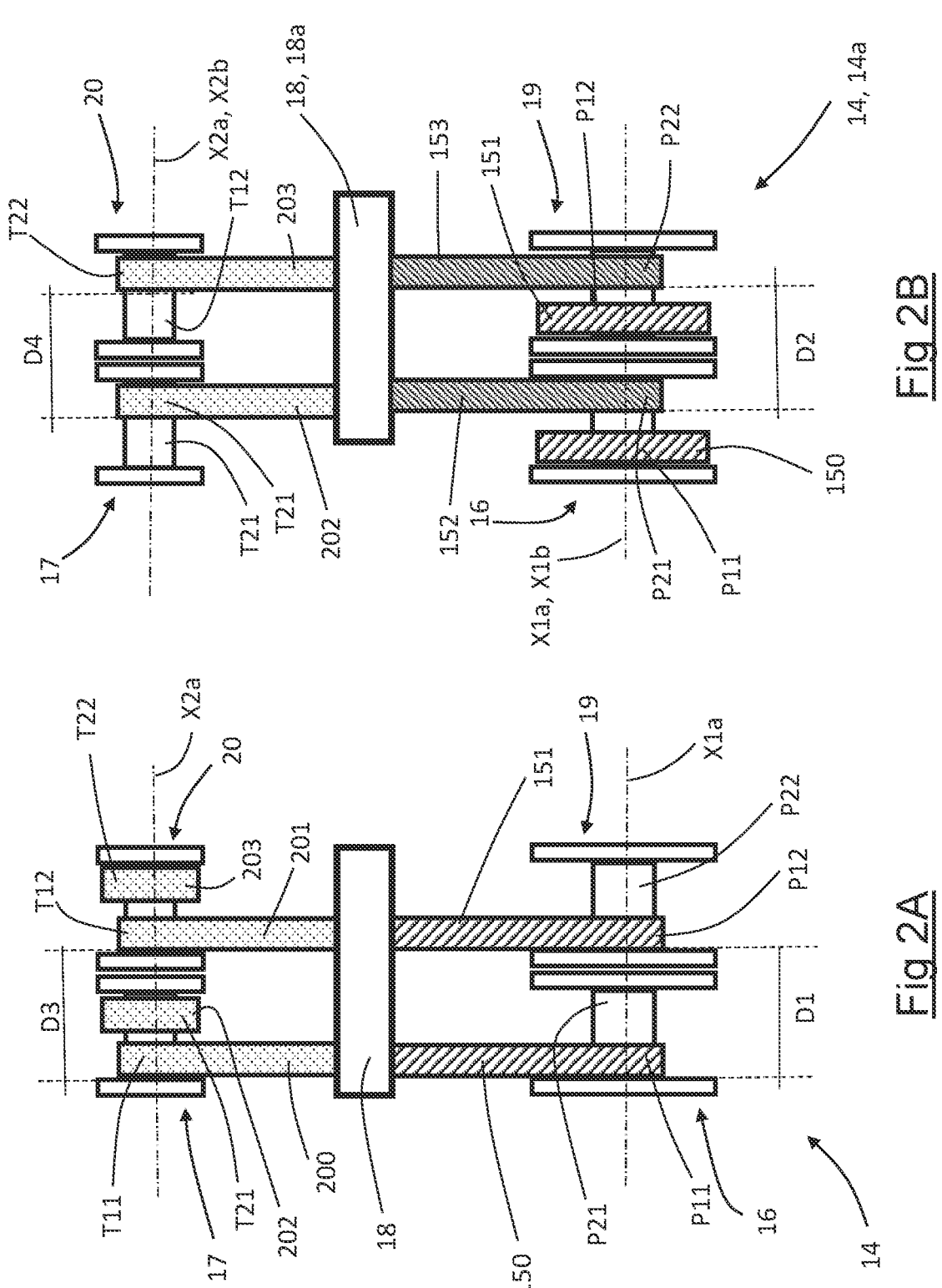

As better represented in FIG. 2A, in the first winding position of the first winding support 16 and of the second winding support 19, the first elongated element 150 is wound in a first axial position P11 on the first winding support 16 and the second elongated element 151 is wound in a first axial position P12 on the second winding support 19.

The first winding support 16 and the second winding support 19 also have respective second axial positions P21, P22 axially spaced from the respective first axial positions P11, P12 and in which the third elongated element 152 and the fourth elongated element 153 are respectively subsequently wound (in ways described hereinafter).

The first axial position P11 on the first winding support 16 is axially spaced from the first axial position P12 on the second winding support 19 by a first distance D1 equal to a second distance D2 that axially separates the second axial position P21 on the first winding support 16 from the second axial position P22 on the second winding support 19.

The first axial position P11 on the first winding support 16 is aligned with a deposition direction of the first elongated element 150 on the first winding support 16 and the first axial position P12 on the second winding support 19 is aligned with a deposition direction of the second elongated element 151 on the second winding support 19, as schematically illustrated in FIG. 2A.

During the winding of the first elongated element 150 on the first winding support 16 and of the second elongated element 151 on the second winding support 19, the first auxiliary winding support 17 and the second auxiliary winding support 20 are arranged in respective first unwinding positions.

As better represented in FIG. 2A, in the first unwinding position of the first auxiliary winding support 17 and of the second auxiliary winding support 20, the first service fabric 200 is unwound from a first axial position T11 of the first auxiliary winding support 17 and the second service fabric 201 is unwound from a first axial position T12 of the second auxiliary winding support 20. A third service fabric 202 and a fourth service fabric 203 are respectively wound on the first auxiliary winding support 17 and on the second auxiliary winding support 20, arranged in respective second axial positions T21, T22 on the first auxiliary winding support 17 and on the second auxiliary winding support 20. The third service fabric 202 and the fourth service fabric 203 are not unwound during the unwinding of the first service fabric 200 and of the second service fabric 201.

The first axial position T11 on the first auxiliary winding support 17 is axially spaced from the first axial position T12 on the second auxiliary winding support 20 by a third distance D3 equal to a fourth distance D4 that axially separates the second axial position T21 on the first auxiliary winding support 17 from the second axial position T22 on the second auxiliary winding support 20.

The first axial position T11 on the first auxiliary winding support 17 is aligned with the deposition direction of the first elongated element 150 on the first winding support 16 and the first axial position T12 on the second auxiliary winding support 20 is aligned with the deposition direction of the second elongated element 151 on the second winding support 19, as schematically illustrated in FIG. 2A.

The first elongated element 150 and the second elongated element 151 with the respective service fabrics 200, 201 coupled are simultaneously wound in coils respectively on the first winding support 16 and on the second winding support 19.

This activity can be carried out by motorizing the rotation axis X1*a* of the first winding support 16 and of the second winding support 19 and leaving the coupling roller 18 idle. The rotation axis X1*a* of the first auxiliary winding support 17 and of the second auxiliary winding support 20 can be idle or preferably slightly braked. Alternatively, both the rotation axis X1*a* of the first winding support 16 and of the second winding support 19 and the coupling roller 18 can be motorized and the rotation axis X2*a* of the first auxiliary winding support 17 and of the second auxiliary winding support 20 can be idle or preferably slightly braked. In any case, the winding of the first elongated element 150 and of the second elongated element 151 on the first winding support 16 and on the second winding support 19 is carried out by exerting a pulling or traction action on the first service fabric 200 and on the second service fabric 201 by the first winding support 16 and the second winding support 19.

The plant 10 also comprises a storage 250 configured to temporarily house the winding supports 16, 19. The winding supports 16, 19 can be transferred from the first winding station 14 to the storage 250.

In accordance with the variant embodiments of FIGS. 1A and 1B, the first winding support 16 and the second winding support 19 with the first elongated element 150 and the second elongated element 151 respectively wound are picked up from the storage 250 and brought into a second winding station 14*a* associated with the second extrusion line 11*a* (FIG. 1B) or brought back into the first winding station 14 after a change of elastomeric material in the first extrusion line 11 (FIG. 1A). Alternatively, in the variant of FIG. 1B the first winding support 16 and the second winding support 19 with the first elongated element 150 and the second elongated element 151 respectively wound are transferred from the first winding station 14 to the second winding station 14a.

The second winding station 14a is structurally the same as the first winding station 14 and is also schematically represented in FIG. 2. Therefore, except when explicitly indicated otherwise, what follows in relation to the operations carried out in the second winding station 14a associated with the second extrusion line 11a in accordance with the variant embodiment of FIG. 1B applies identically to the operations carried out in the first winding station 14 associated with the first extrusion line 11 in accordance with the variant embodiment of FIG. 1A and after the first elongated element 150 and the second elongated element 151 have been respective wound on the first winding support 16 and on the second winding support 19.

In the second winding station 14a it is possible to mount and dismount the first winding support 16 and a second winding support 19 able to rotate about a common rotation axis X1b. In the second winding station 14a it is also possible to mount and dismount the first auxiliary winding support 17 and the second auxiliary winding support 20 able to rotate about a respective rotation axis X2b.

The first auxiliary winding support 17 is configured to unwind the third service fabric 202 that is fed to a coupling roller 18a on which the third elongated element 152 is also fed. At the coupling roller 18a, the third service fabric 202 is coupled with a base surface 152a of the third elongated element 152.

The second auxiliary winding support 20 is configured to unwind the fourth service fabric 203 that is fed to the coupling roller 18a on which the fourth elongated element 153 is also fed. At the coupling roller 18a, the fourth service fabric 203 is coupled with a base surface 153a of the fourth elongated element 153.

The first winding support 16 and the second winding support 19 are arranged in respective second winding positions, as schematically represented in FIG. 2B.

In the second winding position of the first winding support 16 and of the second winding support 19, the third elongated element 152 is wound in the second axial position P21 on the first winding support 16 and the fourth elongated element 153 is wound in the second axial position P22 on the second winding support 19.

The second axial position P21 on the first winding support 16 is aligned with a deposition direction of the third elongated element 152 on the first winding support 16 and the second axial position P22 on the second winding support 19 is aligned with a deposition direction of the fourth elongated element 153 on the second winding support 19, as schematically illustrated in FIG. 2B.

During the winding of the third elongated element 152 on the first winding support 16 and of the fourth elongated element 153 on the second winding support 19, the first auxiliary winding support 17 and the second auxiliary winding support 20 are arranged in respective second unwinding positions.

As better represented in FIG. 2B, in the second unwinding position of the first auxiliary winding support 17 and of the second auxiliary winding support 20, the third service fabric 202 is unwound from a second axial position T21 of the first auxiliary winding support 17 and the fourth service fabric 203 is unwound from a second axial position T22 of the second auxiliary winding support 20.

Preferably, the first auxiliary winding support 17 and the second auxiliary winding support 20 were previously used to unwind the first service fabric 200 and the second service fabric 201. Therefore, the first service fabric 200 and the second service fabric 201 are no longer present on the first auxiliary winding support 17 and on the second auxiliary winding support 20 (as illustrated in FIG. 2B). Alternatively, it is possible to use a first auxiliary winding support 17 and a second auxiliary winding support 20 with a first service fabric 200 and a second service fabric 201 still wound, because not yet used, in respective first axial positions T11, T12 on the first auxiliary winding support 17 and on the second auxiliary winding support 20 (configuration not shown in the figures). In this case, the first service fabric 200 and the second service fabric 201 are not unwound during the unwinding of the third service fabric 202 and of the fourth service fabric 203.

The second axial position T21 on the first auxiliary winding support 17 is aligned with the deposition direction of the third elongated element 152 on the first winding support 16 and the second axial position T22 on the second auxiliary winding support 20 is aligned with the deposition direction of the fourth elongated element 153 on the second winding support 19, as schematically illustrated in FIG. 2B.

The third elongated element 152 and the fourth elongated element 153 with the respective service fabrics 202, 203 coupled are simultaneously wound in coils respectively on the first winding support 16 and on the second winding support 19.

This activity can be carried out by motorizing the rotation axis X1b of the first winding support 16 and of the second winding support 19 and leaving the coupling roller 18a idle. The rotation axis X1b of the first auxiliary winding support 17 and of the second auxiliary winding support 20 can be idle or preferably slightly braked. Alternatively, both the rotation axis X1b of the first winding support 16 and of the second winding support 19 and the coupling roller 18a can be motorized and the rotation axis X2b of the first auxiliary winding support 17 and of the second auxiliary winding support 20 can be idle or preferably slightly braked. In any case, the winding of the third elongated element 152 and of the fourth elongated element 153 on the first winding support 16 and on the second winding support 19 is carried out by exerting a pulling or traction action on the third service fabric 202 and on the fourth service fabric 203 by the first winding support 16 and the second winding support 19.

The first winding support 16 with the first elongated element 150 and the third elongated element 152 wound on it and the second winding support 19 with the second elongated element 151 and the fourth elongated element 153 wound on it are thus transferred to the storage 250 or into a further storage (not illustrated).

What has been described above with reference to the movement of the winding supports 16, 19 from the first winding station 14 to the storage 250 and vice-versa or from the first winding station 14 to the second winding station 14a applies equally to the movement of the auxiliary winding supports 17, 20 from the first winding station 14 to the storage 250 (or to a different storage) and vice-versa or from the first winding station 14 to the second winding station 14a.

The plant 10, in all of the variants described above, also comprises an unwinding station 30 (illustrated in FIG. 3) configured to simultaneously unwind the first elongated element 150 and the third elongated element 152 from the first winding support 16 and/or to unwind the second elongated element 151 and the fourth elongated element 153 from the second winding support 19.

The first winding support 16 and/or the second winding support 19 are transferred to the unwinding station 30 from the storage 250.

The unwinding station 30 operates on the first winding support 16 to simultaneously unwind the first elongated element 150 and the third elongated element 152 and decouple the first service fabric 200 from the first elongated element 150 and the third service fabric 202 from the third elongated element 152. The unwinding station 30 can also operate, alternatively, on the second winding support 19 to simultaneously unwind the second elongated element 151 and the fourth elongated element 153 and decouple the second service fabric 201 from the second elongated element 151 and the fourth service fabric 203 from the fourth elongated element 153.

The unwinding station 30 operates on the first winding support 16 or on the second winding support 19 mounting the first winding support 16 or the second winding support 19, able to rotate about a rotation axis X3a, on a frame 31. It is also possible to mount and dismount a first collecting winding support 70, able to rotate about a respective rotation axis X4a, on the frame 31.

The first collecting winding support 70 is configured to wind the first service fabric 200 and the third service fabric 202 or the second service fabric 201 and the fourth service fabric 203. The first service fabric 200 and the third service fabric 202 or the second service fabric 201 and the fourth service fabric 203 are fed to the first collecting winding support 70 from a decoupling roller 32 at which the first service fabric 200 and the third service fabric 202 are decoupled from the base surface 150a of the first elongated element 150 and from the base surface 152a of the third elongated element 152 or where the second service fabric 201 and the fourth service fabric 203 are decoupled from the base surface 151a of the second elongated element 151 and from the base surface 153a of the fourth elongated element 153.

This activity can be carried out by motorizing the rotation axis X4a of the first collecting winding support 70 and leaving the decoupling roller 32 idle. The rotation axis X3a of the first winding support 16 and of the second winding support 19 can be idle or preferably slightly braked. Alternatively, both the rotation axis X4a of the first collecting winding support 70 and the decoupling roller 32 can be motorized and the rotation axis X3a of the first winding support 16 or of the second winding support 19 can be idle or preferably slightly braked. In any case, the unwinding of the first elongated element 150 and of the third elongated element 152 from the first winding support 16 or of the second elongated element 151 and of the fourth elongated element 153 from the second winding support 19 is carried out by exerting a pulling or traction action on the first service fabric 200 and on the third service fabric 202 or on the second service fabric 201 and on the fourth service fabric 203 by the first collecting winding support 70.

The plant 10 comprises a building line 90 in which at least one forming drum 91 is arranged. The forming drum 91 is operatively associated with the unwinding station 30 to simultaneously receive the two elongated elements that are simultaneously unwound from the first winding support 16 or from the second winding support 19.

The first service fabric 200, the second service fabric 201, the third service fabric 202 and the fourth service fabric 203 are preferably made of polythene, nylon, Mylar®, polyester, or Meraklon® and they are the same as each other.

In a first embodiment illustrated in FIG. 8, such service fabrics are tape-like elements axially sized to each receive a single elongated element, and the same as each other.

In a second embodiment illustrated in FIG. 9, each service fabric 200, 201, 202, 203 comprises a resting surface 201a, 201b, 201c, 201d axially sized to receive a single elongated element. The resting surface 201a, 201b, 201c, 201d is axially delimited by a first axial end shoulder 202a, 202b, 202c, 202d and by a second axial end shoulder 203a, 203b, 203c, 203d. Such shoulders have extension in the radial direction that is the same as each other and greater than the extension in the radial direction of the elongated element intended to be received on the resting surface 201a, 201b, 201c, 201d. When a service fabric is wound in coils, two radially adjacent coils are radially spaced apart by an amount equal to the extension in the radial direction of the first axial end shoulder 202a, 202b, 202c, 202d or of the second axial end shoulder 203a, 203b, 203c, 203d. Two radially adjacent coils therefore have portions of the first axial end shoulder 202a, 202b, 202c, 202d juxtaposed and corresponding portions of the second axial end shoulder 203a, 203b, 203c, 203d juxtaposed.

Figure 5:
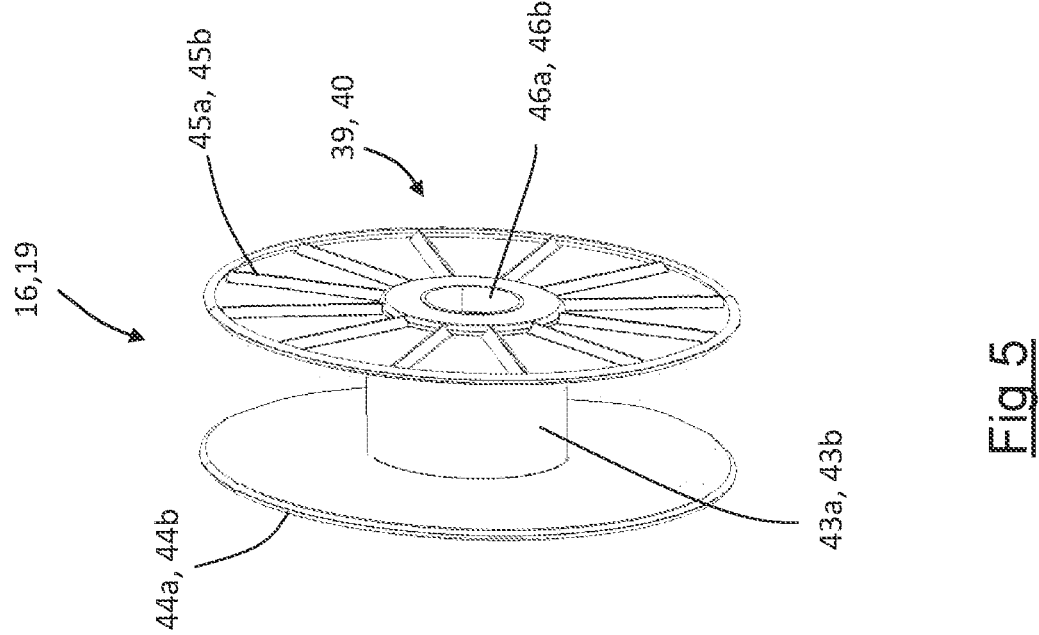
FIGS. 4 and 5 represent two types of winding supports suitable to be used in the plant of FIG. 1 and in the method for arranging elongated elements in accordance with the present invention.
Figure 4:
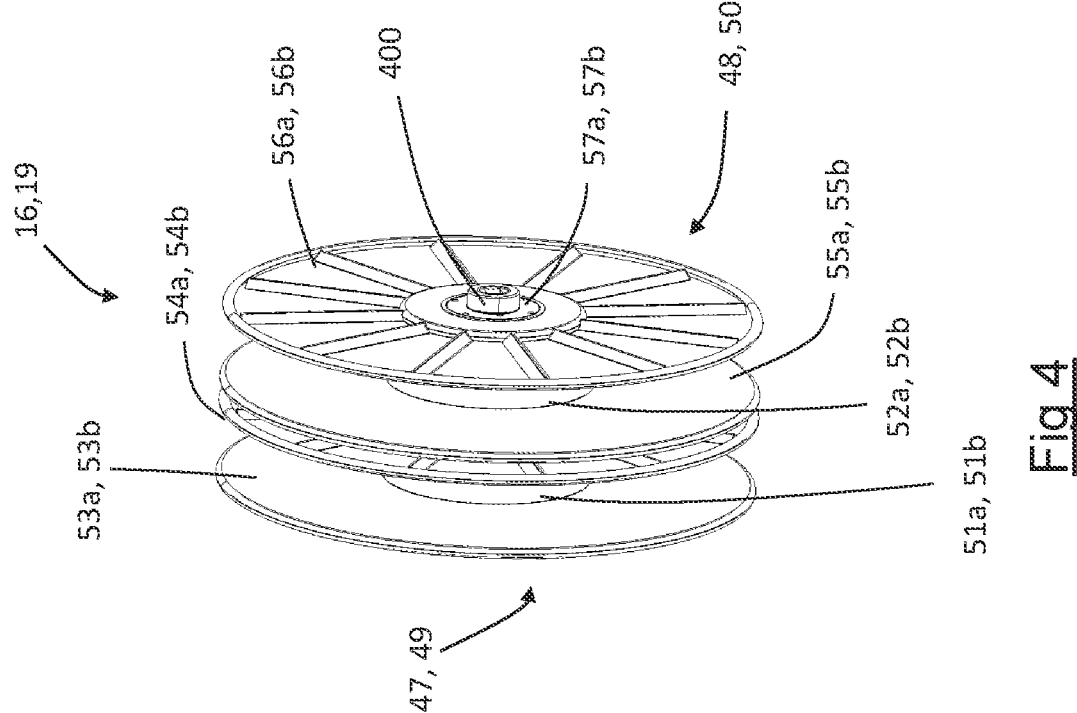

The first winding support 16 and the second winding support 19 can alternatively be made according to the embodiments illustrated in FIGS. 4 and 5.

In accordance with the embodiment of FIG. 5, the first initial winding support 16 comprises a storage bobbin 39 and the second initial winding support 19 comprises a storage bobbin 40. Such storage bobbins 39, 40 are the same as each other in structure and therefore only one storage bobbin will be described since such a description is also valid for the other storage bobbin.

Each storage bobbin 39, 40 comprises a winding surface 43a, 43b sized to wind a pair of elongated elements (with the relative service fabric) in coils. The coils of one elongated element are axially spaced from the coils of the other elongated element along the winding surface 43a, 43b. The winding surface 43a, 43b is axially delimited by a first annular body 44a, 44b and by a second annular body 45a, 45b. The winding surface 43a, 43b is substantially cylindrical and extends around a through cavity 46a, 46b able to be crossed by a shaft (not shown) about which the storage bobbin 39, 40 can rotate.

in accordance with the embodiment of FIG. 4, the first winding support 16 comprises a first storage bobbin 47 and a second storage bobbin 48 and the second winding support 19 comprises a first storage bobbin 49 and a second storage bobbin 50. Such first storage bobbins 47, 49 are the same as each other in structure and therefore only one first storage bobbin will be described since such a description is valid for both of the first storage bobbins. Such second storage bobbins 48, 50 are the same as each other in structure and therefore only one second storage bobbin will be described since such a description is valid for both of the second storage bobbins.

Each first storage bobbin 47, 49 comprises a winding surface 51a, 51b sized to wind a single elongated element with the relative service fabric in coils. Each second storage bobbin 48, 50 comprises a winding surface 52a, 52b sized to wind a single elongated element with the relative service fabric in coils. The winding surface 51a, 51b of the first storage bobbin 47, 49 is axially delimited by a first annular body 53a, 53b and by a second annular body 54a, 54b. The winding surface 52a, 52b of the second storage bobbin 48, 50 is axially delimited by a first annular body 55a, 55b and by a second annular body 56a, 56b. The winding surfaces 51a, 51b, 52a, 52b of the first and of the second storage bobbin are substantially cylindrical and extend around respective through cavities 57a, 57b able to be crossed by a coupling device 400 configured to structurally couple the first storage bobbin 47, 49 and the second storage bobbin 48, 50 and make them rotatable, possibly independently from one another, about a common rotation axis.

The embodiment of FIG. 5 of the first winding support 16 and of the second winding support 19 is particularly useful when the first elongated element 150 and the third elongated element 152 have winding diameters that are the same as each other (and therefore when also the second elongated element 151 and the fourth elongated element 153 have winding diameters that are the same as each other).

The embodiment of FIG. 4 of the first winding support 16 and of the second winding support 19 is particularly useful when the first elongated element 150 and the third elongated element 152 have winding diameters that are different from each other (and therefore when also the second elongated element 151 and the fourth elongated element 153 have winding diameters that are different from each other).

In this case, the first storage bobbins 47, 49 can be connected to the second storage bobbins 48, 50 through the coupling device 400 (as described hereinafter).

In this case, it is alternatively possible to use the service fabrics of the embodiment of FIG. 9, which allow to bring the winding diameters of the first elongated element 150, of the third elongated element 152, of the second elongated element 151, and of the fourth elongated element 153 back equal to one another.

Figures 6, 7:
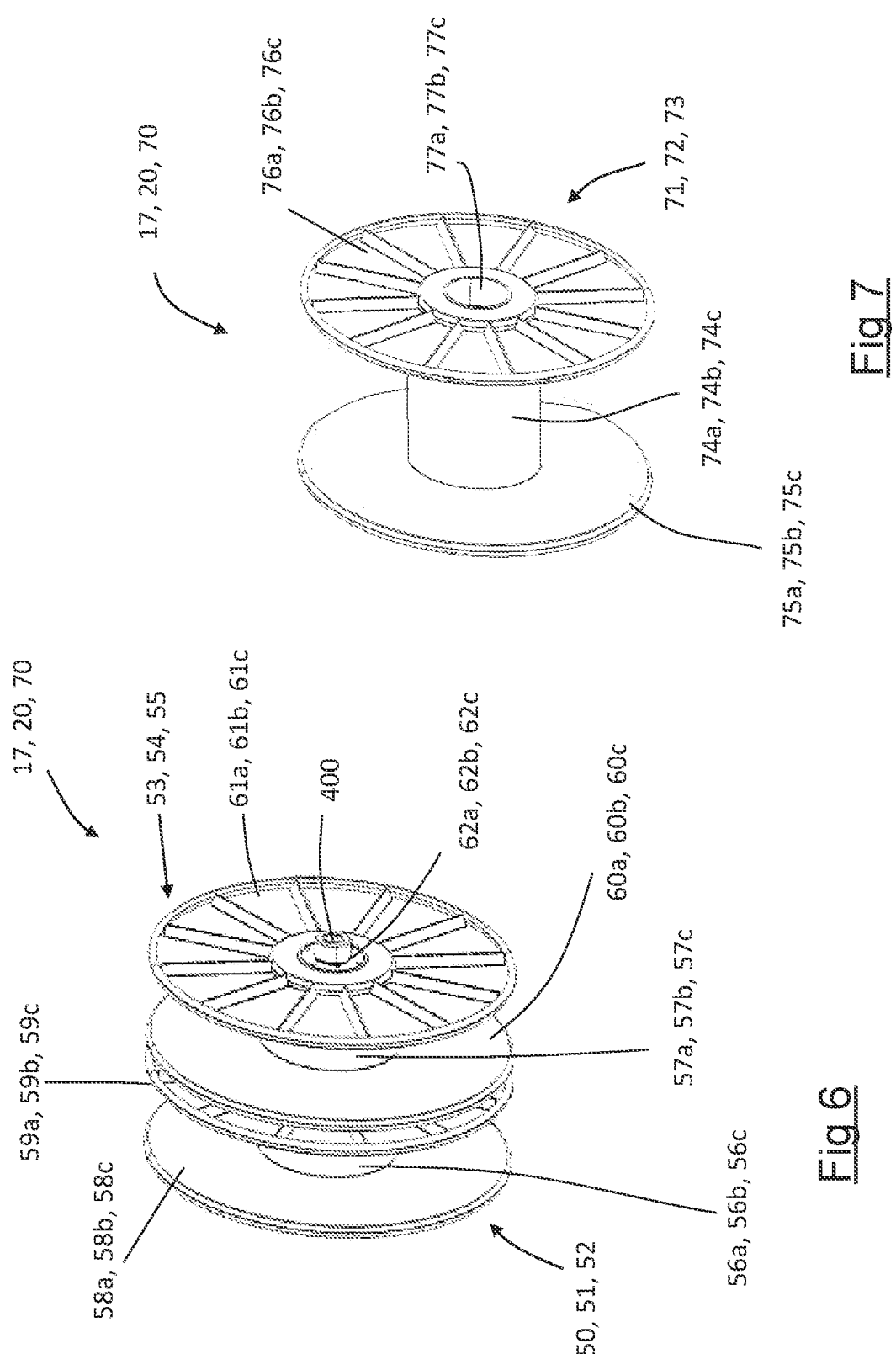
FIGS. 6 and 7 represent two types of auxiliary winding supports and of collecting winding supports suitable to be used in the plant of FIG. 1 and in the method for arranging elongated elements in accordance with the present invention.

The first auxiliary winding support 17 and the second auxiliary winding support 20 can alternatively be made according to the embodiments illustrated in FIGS. 6 and 7. The collecting winding support 70 can also alternatively be made according to the embodiments illustrated in FIGS. 6 and 7. Therefore, the structure of a single auxiliary winding support will be described since such a description can also be referred to the other auxiliary winding support and to the collecting winding support.

In accordance with the embodiment of FIG. 6, the auxiliary winding support 17, 20 (or the collecting winding support 70) comprises a first auxiliary storage bobbin 50, 51 (or a first collecting bobbin 52) and a second auxiliary storage bobbin 53, 54 (or a second collecting bobbin 55). The first auxiliary storage bobbin 50, 51 (or the first collecting bobbin 52) comprises a winding surface 56a, 56b, 56c sized to house coils of a first service fabric. The second auxiliary storage bobbin 53, 54 (or the second collecting bobbin 55) comprises a winding surface 57a, 57b, 57c sized to house coils of a second service fabric. The winding surface 56a, 56b, 56c of the first auxiliary storage bobbin 50, 51 (or of the first collecting bobbin 52) is axially delimited by a first annular body 58a, 58b, 58c and by a second annular body 59a, 59b, 59c. The winding surface 57a, 57b, 57c of the second auxiliary storage bobbin 53, 54 (or of the second collecting bobbin 55) is axially delimited by a first annular body 60a, 60b, 60c and by a second annular body 61a, 61b, 61c. The winding surfaces 56a, 56b, 56c, 57a, 57b, 57c are substantially cylindrical and extend around respective through cavities 62a, 62b, 62c able to be crossed by a coupling device 400 configured to structurally couple the first auxiliary storage bobbin 50, 51 (or the first collecting bobbin 52) and the second auxiliary storage bobbin 53, 54 (or the second collecting bobbin 55) and make them rotatable, possibly independently from one another, about a common rotation axis.

In accordance with the embodiment of FIG. 7, the auxiliary winding support 17, 20 (or the collecting winding support 70) comprises an auxiliary storage bobbin 71, 72 (or a first collecting bobbin 73). The auxiliary storage bobbin 71, 72 (or the first collecting bobbin 73) comprises a winding surface 74a, 74b, 74c sized to house coils of two axially spaced service fabrics. The winding surface 74a, 74b, 74c is axially delimited by a first annular body 75a, 75b, 75c and by a second annular body 76a, 76b, 76c. The winding surface 74a, 74b, 74c is substantially cylindrical and extends around a through cavity 77a, 77b, 77c able to be crossed by a shaft (not shown) about which the auxiliary storage bobbin 71, 72 (or the first collecting bobbin 73) can rotate.

FIG. 10 represents the first winding support 16 and the third winding support 19 made in accordance with FIG. 4 in which the respective first storage bobbins 47, 49 and the respective second storage bobbins 48, 50 are coupled with the coupling device 400.

The first coupling device 400 comprises a first coupling portion 401 and a second coupling portion 402 able to rotate about a rotation axis X1. In an unlocked condition, the first coupling portion 401 is able to rotate about the rotation axis X1 with respect to the second coupling portion 402. In a locked condition, the first coupling portion 401 rotates as a unit with the second coupling portion 402 about the rotation axis X1.

The first coupling portion 401 is connected to the first storage bobbin 47, 49 so that the first coupling portion 401 and the first storage bobbin 47, 49 rotate together. The second coupling portion 402 is connected to the second storage bobbin 48, 50 so that the second coupling portion 402 and the second storage bobbin 48, 50 rotate together.

The configuration that provides for the unlocked condition of the first coupling portion 401 with respect to the second coupling portion 402 allows to simultaneously unwind two elongated elements having winding diameters that are different from each other each of which is wound on a respective storage bobbin.

The configuration that provides for the locked condition of the first coupling portion 401 with respect to the second coupling portion 402 allows to simultaneously unwind two elongated elements having winding diameters that are the same as each other each of which is wound on a respective storage bobbin.

This last configuration can be replaced by a configuration in which the first storage bobbin 47, 49 and the second storage bobbin 48, 50 are joined together by a single rigid shaft.

The present invention has been described with reference to some preferred embodiments. Different modifications can be made to the embodiments described above, whilst still being encompassed by the scope of protection of the invention, defined by the following claims.

The invention claimed is:

1. A method for arranging elongated elements to be used in a process for building tyres for vehicle wheels, comprising:

simultaneously winding a first elongated element and a second elongated element of a first type, respectively on a first winding support and on a second winding support by arranging the first elongated element in a first axial position on the first winding support and the second elongated element in a first axial position on the second winding support, wherein the first elongated element and the second elongated element of the first type are the same as each other; and simultaneously winding a third elongated element and a fourth elongated element of a second type respectively on said first winding support and on said second winding support by arranging the third elongated element on the first winding support in a second axial position different from the first axial position on the first winding support and the fourth elongated element on the second winding support in a second axial position different from the first axial position on the second winding support, wherein the elongated elements of the second type are the same as each other and are different from the elongated elements of the first type, wherein simultaneously winding the first elongated element and the second elongated element comprises arranging the first winding support and the second winding support in respective first winding positions;

wherein simultaneously winding the third elongated element and the fourth elongated element comprises arranging the first winding support and the second winding support in respective second winding positions; and wherein arranging the first winding support and the second winding support in respective second winding positions comprises moving the first winding support and the second winding support from the respective first winding positions to the respective second winding positions.

2. The method according to claim 1, wherein moving the first winding support and the second winding support in the respective second winding positions comprises arranging the first winding support with the first elongated element wound on the first winding support and the second winding support with the second elongated element wound on the second winding support in the respective second winding positions.

3. The method according to claim 1, wherein the first axial position on the first winding support is axially spaced from the first axial position on the second winding support by a first distance; and wherein the second axial position on the first winding support is axially spaced from the second axial position on the second winding support by a second distance equal to said first distance.

4. The method according to claim 1, wherein simultaneously winding the first elongated element and the second elongated element, respectively on the first winding support and on the second winding support, comprises associating a first service fabric with the first elongated element and a second service fabric with the second elongated element.

5. The method according to claim 4, wherein simultaneously winding the third elongated element and the fourth elongated element comprises associating a third service fabric with the third elongated element and a fourth service fabric with the fourth elongated element.

6. The method according to claim 5, wherein associating the first service fabric with the first elongated element comprises unwinding the first service fabric from an auxiliary first winding support and wherein associating the second service fabric with the second elongated element comprises unwinding the second service fabric from an auxiliary second winding support.

7. The method according to claim 6, wherein unwinding the first service fabric and the second service fabric comprises arranging the auxiliary first winding support and the auxiliary second winding support in respective first unwinding positions.

8. The method according to claim 7, wherein associating the third service fabric with the third elongated element comprises unwinding the third service fabric from the auxiliary first winding support; and wherein associating the fourth service fabric with the fourth elongated element comprises unwinding the fourth service fabric from the auxiliary second winding support.

9. The method according to claim 8, wherein unwinding the third service fabric and the fourth service fabric comprises arranging the auxiliary first winding support and the auxiliary second winding support in respective second unwinding positions.

10. The method according to claim 9, wherein arranging the auxiliary first winding support and the auxiliary second winding support in respective second unwinding positions comprises moving the auxiliary first winding support and the auxiliary second winding support from the respective first unwinding positions to the respective second unwinding positions.

11. The method according to claim 5, wherein said first service fabric and said second service fabric comprise respective resting surfaces and respective two axial end shoulders;

wherein associating the first service fabric with the first elongated element and the second service fabric with the second elongated element comprises associating the first elongated element with the resting surface of the first service fabric between the respective two axial end shoulders and the second elongated element with the resting surface of the second service fabric between the respective two axial end shoulders; and wherein the two axial end shoulders of the first service fabric and the two axial end shoulders of the second service fabric have equal extension in a radial direction and have greater extension in the radial direction than the extension in the radial direction of the first elongated element and of the second elongated element.

12. The method according to claim 11, wherein said third service fabric and said fourth service fabric comprise respective resting surfaces and respective two axial end shoulders;

wherein associating the third service fabric with the third elongated element and the fourth service fabric with the fourth elongated element comprises:

associating the third elongated element with the resting surface of the third service fabric between the respective two axial end shoulders, and associating the fourth elongated element with the resting surface of the fourth service fabric between the respective two axial end shoulders; and wherein the two axial end shoulders of the third service fabric and the two axial end shoulders of the fourth service fabric have equal extension in the radial direction and have greater extension in the radial direction than the extension in the radial direction of the third elongated element and of the fourth elongated element.

13. A process for building tyres for vehicle wheels, comprising:

performing the method according to claim 1;

arranging the first winding support or the second winding support in a building line close to a forming drum; and simultaneously unwinding the first elongated element and the third elongated element from said first winding support or simultaneously unwinding the second elongated element and the fourth elongated element from said second winding support and simultaneously depositing the first elongated element and the third elongated element or the second elongated element and the fourth elongated element on the forming drum.

14. The process according to claim 13, wherein simultaneously winding the first elongated element and the second elongated element comprises arranging a first elastomeric material in a first extrusion line and simultaneously extruding the first elongated element and the second elongated element; and wherein simultaneously winding the third elongated element and the fourth elongated element comprises changing elastomeric material in said first extrusion line and simultaneously extruding the third elongated element and the fourth elongated element.

15. The process according to claim 13, wherein simultaneously winding the first elongated element and the second elongated element comprises simultaneously extruding the first elongated element and the second elongated element from a first extrusion line; and wherein simultaneously winding the third elongated element and the fourth elongated element comprises simultaneously extruding the third elongated element and the fourth elongated element from a second extrusion line.

\* \* \* \* \*